(12) United States Patent
Funke et al.

(10) Patent No.: US 11,868,352 B2
(45) Date of Patent: *Jan. 9, 2024

(54) SYSTEMS AND METHODS FOR SPILLING DATA FOR HASH JOINS

(71) Applicant: Snowflake Inc., Bozeman, MT (US)

(72) Inventors: Florian Andreas Funke, San Francisco, CA (US); Megha Thakkar, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,464

(22) Filed: Dec. 1, 2022

(65) Prior Publication Data
US 2023/0334050 A1 Oct. 19, 2023

Related U.S. Application Data

(63) Continuation of application No. 17/721,599, filed on Apr. 15, 2022, now Pat. No. 11,550,793.

(51) Int. Cl.
*G06F 16/24* (2019.01)
*G06F 16/2455* (2019.01)

(52) U.S. Cl.
CPC .... *G06F 16/2456* (2019.01); *G06F 16/24554* (2019.01)

(58) Field of Classification Search
CPC .................................................. G06F 16/2456
USPC .......................................................... 707/640
See application file for complete search history.

(56) References Cited

U.S. PATENT DOCUMENTS

| | | | |
|---|---|---|---|
| 10,250,451 B1 * | 4/2019 | Moghe | H04L 43/091 |
| 10,423,644 B1 * | 9/2019 | Leach | G06F 16/24542 |
| 2014/0032569 A1 * | 1/2014 | Kim | G06F 16/137 |
| | | | 707/747 |
| 2014/0250142 A1 * | 9/2014 | Pradhan | G06F 16/2456 |
| | | | 707/765 |

* cited by examiner

*Primary Examiner* — Syling Yen
(74) *Attorney, Agent, or Firm* — Womble Bond Dickinson (US) LLP

(57) ABSTRACT

A method includes determining that an amount of available space in a first memory used by a set of relational queries is insufficient for a query, wherein the query comprises a join operation. A first partition of a set of partitions is identified, wherein the first partition possesses a smallest available probe memory size of the set of partitions and a build memory size greater than or equal to a threshold memory size, wherein the threshold memory size is a percentage of a maximum build memory size, and the largest partition of the set of partitions has the maximum build memory size. The first partition is copied from the first memory to a second memory.

17 Claims, 8 Drawing Sheets

|  | Partition A | Partition B | Partition C | Partition D |
|---|---|---|---|---|
| Build Memory Size | 100 MB | 80 MB | 85 MB | 50 MB |
| Probe Memory Size | 150 MB | 50 MB | 60 MB | 55 MB |

*FIG. 5*

SYSTEMS AND METHODS FOR SPILLING DATA FOR HASH JOINS

RELATED APPLICATIONS

This application is a continuation of co-pending U.S. patent application Ser. No. 17/721,599, filed Apr. 15, 2022, which is hereby incorporated by reference in its entirety.

TECHNICAL FIELD

The present disclosure relates to resource management systems and methods that manage data storage and computing resources.

BACKGROUND

Many existing data storage and retrieval systems are available today. For example, in a shared-disk system, all data is stored on a shared storage device that is accessible from all of the processing nodes in a data cluster. In this type of system, all data changes are written to the shared storage device to ensure that all processing nodes in the data cluster access a consistent version of the data. One of the main disadvantages of the shared link system is that as the number of processing nodes increases in a shared-disk system, the shared storage device (and the communication links between the processing nodes and the shared storage device) becomes a bottleneck that slows data read and data write operations. This bottleneck is further aggravated with the addition of more processing nodes. Thus, existing shared-disk systems have limited scalability due to this bottleneck problem.

Another existing data storage and retrieval system is referred to as a "shared-nothing architecture." In this architecture, data is distributed across multiple processing nodes such that each node stores a subset of the data in the entire database. When a new processing node is added or removed, the shared-nothing architecture must rearrange data across the multiple processing nodes. This rearrangement of data can be time-consuming and disruptive to data read and write operations executed during the data rearrangement. And, the affinity of data to a particular node can create "hot spots" on the data cluster for popular data. Further, since each processing node also performs the storage function, this architecture requires at least one processing node to store data. Thus, a disadvantage of the shared-nothing architecture is that it fails to store data if all processing nodes are removed. Additionally, management of data in a shared-nothing architecture is complex due to the distribution of data across many different processing nodes.

The systems and methods described herein provide an improved approach to data storage and data retrieval that alleviates the above-identified limitations of existing systems.

BRIEF DESCRIPTION OF THE DRAWINGS

Embodiments of the disclosure are illustrated by way of example and not limitation in the figures of the accompanying drawings in which like references indicate similar elements. The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is an example table illustrating build memory sizes and probe memory sizes for different partitions, in accordance with one or more embodiments of the present disclosure.

DETAILED DESCRIPTION

Figure 1:
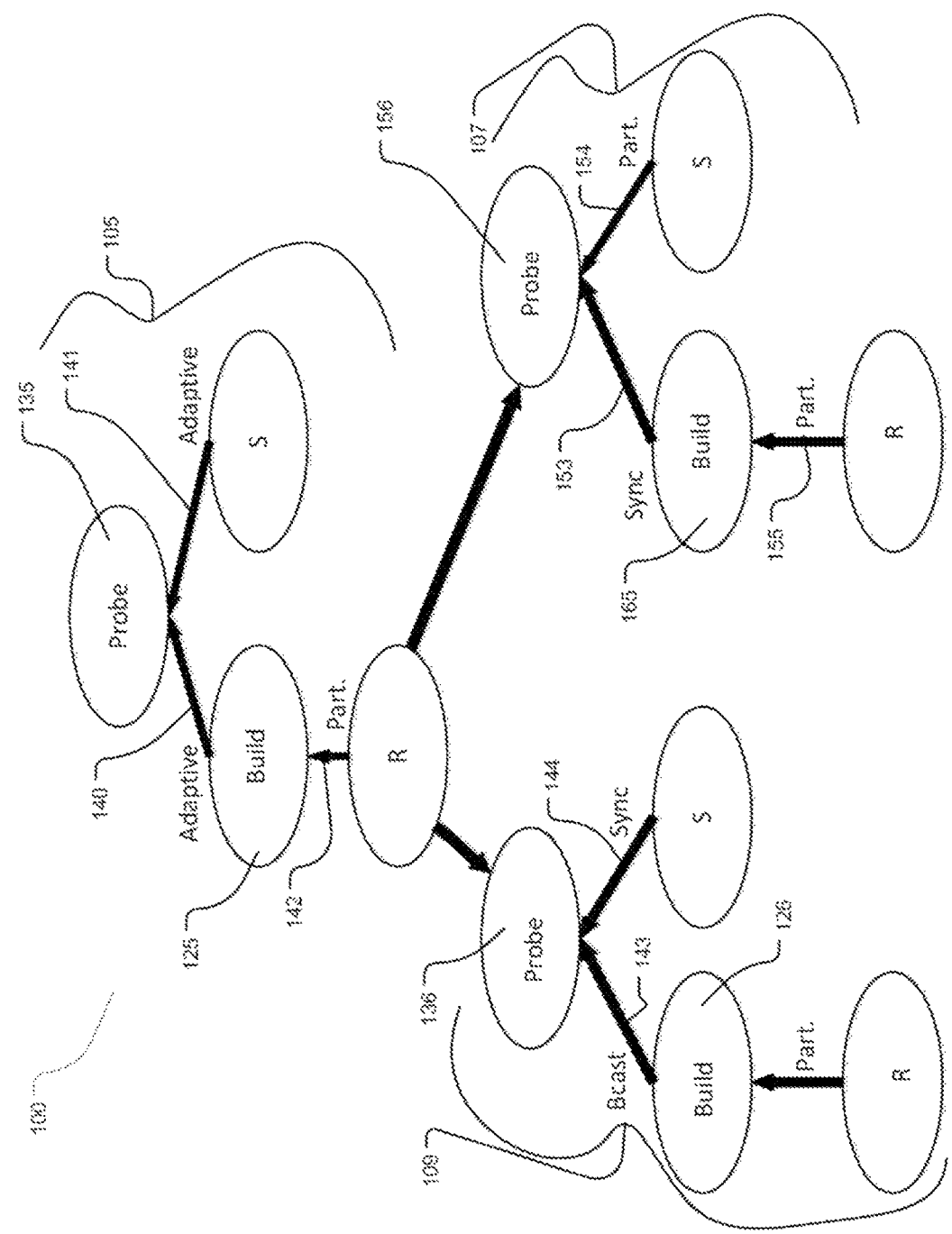
FIG. 1 illustrates a series of processes for joining a plurality of relations, in accordance with one or more embodiments of the present disclosure.

FIG. 1 illustrates a schematic of processes for joining a plurality of relations, in accordance with one or more embodiments of the present disclosure. Assume we are computing a join of two relations R and S. The figure shows three separate execution plans of processes that make up the join of the two relations R and S. Relational operators and input expressions are represented as ovals, and communication links are represented as arrows, and the direction of the arrow indicates the direction of data flow. While the plan shows each operator as a single oval that may be part of a distributed execution plan. For each operator there are n instances, one instance for each process or machine in the system. These instances run in parallel and exchange data chiefly through communication links. In furtherance of the example implementation, let the input relations R and S be partitioned (i.e. fragmented) among the n processors or machines in the system. There are two basic ways to compute a distributed join of R and S: broadcast one of the relations, or re-partition both input relations.

As used herein a join is a binary operator, taking at least two relations and a binary predicate as inputs from a user via a computer, and producing a single relation which contains the set of all combinations of tuples in the two relations which satisfy the predicate. To produce the correct result, any implementation of join associates all pairs of tuples which may satisfy the predicate. In a distributed implementation of a join, the system may copy tuples of the original relations over the network such that every corresponding pair of tuples is made available at one process, or on one computer within the system, which can then evaluate the predicate and produce a desired result of all tuples that satisfy the predicate.

As can be seen in the figure, relations R and S, and a binary predicate ($\theta$) may be received as inputs and processed into producing a single relation R ⋈ $\theta$S which contains the set of all combinations of tuples in R and S which satisfy the predicate θ. It should be noted that to produce the correct result, any implementation of join must bring together all pairs of tuples which may satisfy the predicate θ. In a distributed implementation of join, the system may therefore copy tuples of R and S over the networked system such that every corresponding pair of tuples becomes available to one process or machine within the system, which can then evaluate the predicate against the relations and discover all resultant tuples that satisfy the predicate.

As illustrated in the example, the input relations R and S may be stored (i.e. fragmented) among a plurality of processors or machines in a system. In an implementation a distributed join of R and S may be computed by either broadcasting one of the relations over the network, or by re-partitioning both input relations into a single location within the system.

In a broadcasting join, one of the input relations (typically the smaller relation) is broadcast to n-number of processors or machines, while the other input relation (typically the larger relation) remains in situ. In the present implementation, |X| may represent the size of relation X in number of bytes, and relation R may be the relation that is broadcasted, therefore resulting in an expected asymptotic network cost of broadcast join that is represented by the expression O(|R|*n).

In contrast, a re-partitioning join partitions the input relations according to one or more of the join keys (columns on which there exists an equality join predicate as part of the query). In certain embodiments, both hash partitioning or range partitioning may be applicable for this purpose. Each process or machine may be assigned one of the partitions, and the data of both input relations may then be copied over the network accordingly. The expected asymptotic network cost of this re-partitioning is O(|R|+|S|).

Additionally, one skilled in the art will recognize that deciding on which technique to apply, broadcast or re-partition, in order to minimize the network cost may be dependent on the size of the smaller input relation, say R. For example, if |R|*n<|R|+|S|, then a broadcast join may be preferred, otherwise a re-partitioning join is to be preferred.

It should be noted that network cost is just one metric to use for purposes of making a decision as to which join method is employed. In an implementation, a system may also take the memory cost and computational cost of the per-partition joins into account. It will be recognized by one skilled in the art that a broadcasting join replicates the broadcast relation at every process and it generally has higher memory and computational cost than a re-partitioning join.

The join implementation may be split into two operators: build operators 125 and probe operators 135. The build operator 125 may be responsible for deciding whether to perform a broadcasting join or a re-partitioning join, while the probe operator 135 performs the actual, local join. A local join implementation may be orthogonal to this invention such that any local join implementation is possible such as for example: hash join, sort-merge join, and nested-loops. As used herein, a build operator typically builds a hash table while a probe operator reads the inner stream and probes the hash table to find matching rows in order to complete a hash join process. Additionally, as used herein an join is an inner join statement or operation that uses an equivalence operation (i.e., colA=colB) to match rows from different tables, wherein an inner join statement requires each record in the joined relations to have matching records.

The upper plan 105 shows an execution plan at the beginning of query execution. The communication link 140 between the build operator and the probe operator, as well as communication link 141 between S and the probe operator, are initially inactive and in the "adaptive" state. The communication link 142 between R and the build operator is in the "partition" state, which means that any tuples produced by R are forwarded to one of the instances of the build operator, as determined by a partitioning function, such as a hash function over one or more of the columns of R which appear in equality predicates of the join predicate.

Initially, only the "left" side of the upper plan 105 in the figure may be executed; that is, the input relation R (which can be a base relation or itself the output of some complex sub-expression, for example another join) is fully consumed and forwarded to the build operator 125. One skilled in the art will understand that the build operator 125 may buffer all its input, either in main memory or on external storage (disk).

Once the relation R has been fully consumed by the build operator 125, the actual size of the relation R is known because the system knows the amount of data that has just been processed in the build operation. The system may then determine whether to perform a broadcasting or re-partitioning join based on the known-actual size of relation R, an estimated size of relation S, and a predetermined cost metric as discussed above.

It can be seen in FIG. 1 that the left lower execution plan 109 shows the plan for the broadcasting join, and the right lower execution plan 107 shows the plan for the re-partitioning join.

As illustrated, if the build operator decides to perform a broadcasting join, the link between the build operator and the probe operator is converted into a "bcast" (broadcast) link 143, and the link between relation S and the probe operator is converted into a "sync" (synchronous) link. Then, it sends relation R through the broadcast link 143, which means the local partition of relation R of each instance of the build operator 126 is broadcasted to every instance of the probe operator 136. As used herein the terms "synchronous link" denote a local, one-to-one link between two operator instances, and does not cross machine or thread boundaries and can thus be implemented with relative efficiency. For example, a synchronous link may be a simple function call from the upstream operator's code into the downstream operator's code. In this implementation, a synchronous link does not perform a network transfer, and the local partition of relation S of each process or machine is directly forwarded to its local instance of the probe operator 136.

Conversely, if the build operator decides to perform a re-partitioning join, the communication link between the build operator 165 and the probe operator 156 is converted into a "sync" link 153, and converts the link between S and the probe operator into a partition or "part" link 154. Additionally, the partitioning function on relation S may be "compatible" with the partitioning function previously applied to relation R (in the communication link 155 between R and the build operator), such that each pair of tuples which may satisfy the predicate ends up in the same partition and thus at the same instance of the probe operator 156.

An important optimization to the re-partitioning example above, is that the build operator 165 instances need not read back their buffered input in order to send it over the "sync" link to their individually corresponding probe operator 156 instances. Relation R has already been re-partitioned by the communication link 155 between R and the build operator in a manner that is compatible with the "part." link 154 that is between S and the probe operator. Thus, the partition of relation R belonging to a corresponding build operator 165 instance can be passed whole without further processing. In some implementation the partition of relation R may be passed as a single pointer to a block of memory or a file on disk.

In contrast to existing products which rely on the query optimizer to make the decision on whether to broadcast or re-partition ahead of time, the present method describes a way to defer the decision on whether to broadcast or re-partition to query execution time; that is, to the point when the size of one of the input relations is known with certainty, and the size of the other input relation can often be estimated with greater accuracy. Thus, the present implementation provides a way to both determine the cost of a broadcasting join with a high level of certainty, and whether to make the decision to broadcast or re-partition relations with greater confidence.

These methods and processes may be immediately applicable to all implementations of distributed join as found in virtually all distributed relational database systems, as well as implementations of join in dataflow systems such as Hadoop/MapReduce. The above processes may be performed in a system having resource managers and multiple users.

Figure 2:
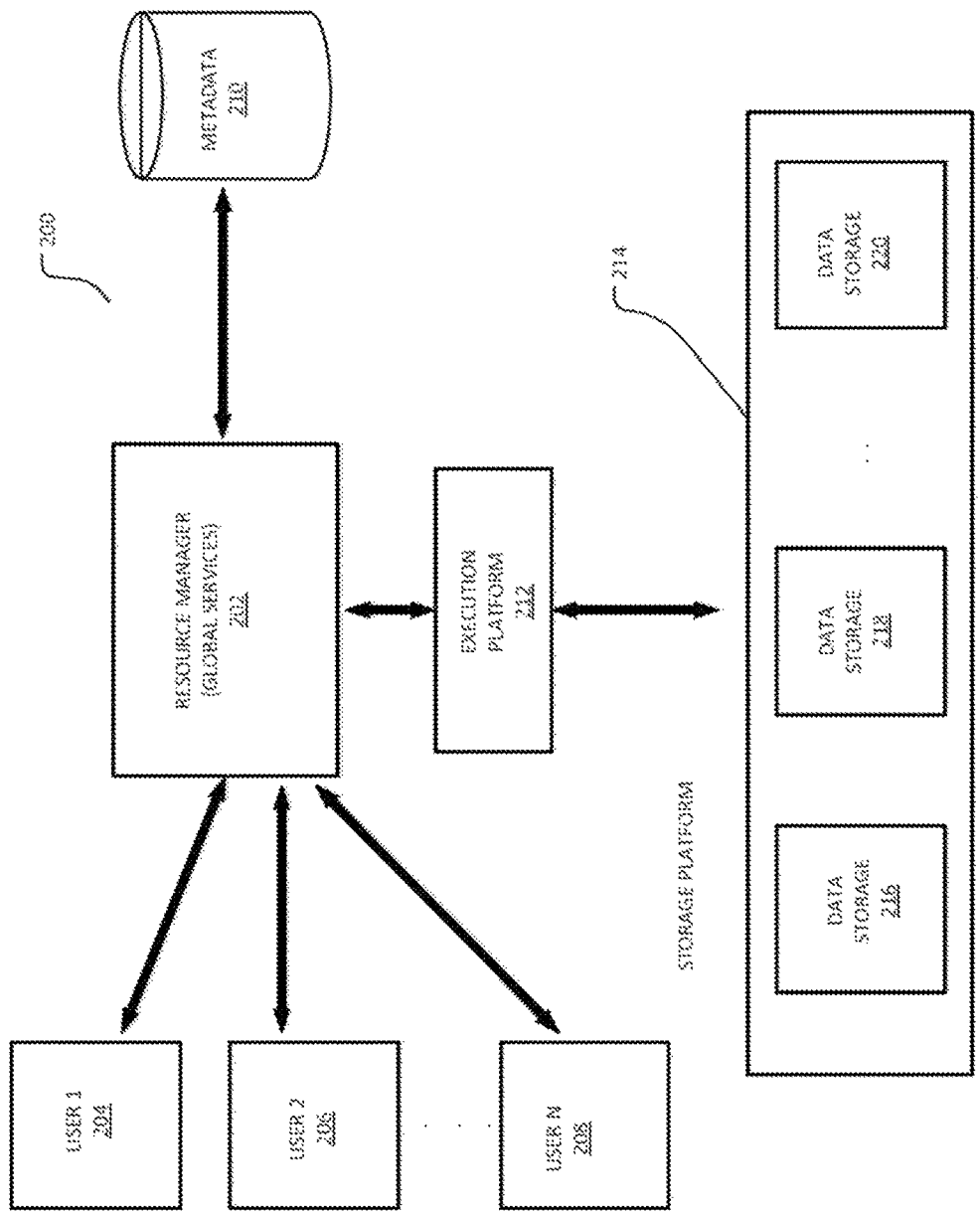
FIG. 2 illustrates a block diagram depicting an example systems and methods, in accordance with one or more embodiments of the present disclosure.

FIG. 2 illustrates a block diagram depicting an example systems and methods, in accordance with one or more embodiments of the present disclosure. As shown in FIG. 2, a resource manager 202 is coupled to multiple users 204, 206, and 208. In particular implementations, resource manager 202 can support any number of users desiring access to data processing platform 200. Users 204-208 may include, for example, end users providing data storage and retrieval requests, system administrators managing the systems and methods described herein, and other components/devices that interact with resource manager 202. Resource manager 202 provides various services and functions that support the operation of all systems and components within data processing platform 200. Resource manager 202 is also coupled to metadata 210, which is associated with the entirety of data stored throughout data processing platform 200. In some embodiments, metadata 210 includes a summary of data stored in remote data storage systems as well as data available from a local cache. Additionally, metadata 210 may include information regarding how data is organized in the remote data storage systems and the local caches. Metadata 210 allows systems and services to determine whether a piece of data needs to be processed without loading or accessing the actual data from a storage device.

Resource manager 202 is further coupled to an execution platform 212, which provides multiple computing resources that execute various data storage and data retrieval tasks, as discussed in greater detail below. Execution platform 212 is coupled to multiple data storage devices 216, 218, and 220 that are part of a storage platform 214. Although three data storage devices 216, 218, and 220 are shown in FIG. 2, execution platform 212 is capable of communicating with any number of data storage devices. In some embodiments, data storage devices 216, 218, and 220 are cloud-based storage devices located in one or more geographic locations. For example, data storage devices 216, 218, and 220 may be part of a public cloud infrastructure or a private cloud infrastructure. Data storage devices 216, 218, and 220 may be hard disk drives (HDDs), solid state drives (SSDs), storage clusters, Amazon S3™ storage systems or any other data storage technology. Additionally, storage platform 214 may include distributed file systems (such as Hadoop Distributed File Systems (HDFS)), object storage systems, and the like.

In particular embodiments, the communication links between resource manager 202 and users 204-208, metadata 210, and execution platform 212 are implemented via one or more data communication networks. Similarly, the communication links between execution platform 212 and data storage devices 216-220 in storage platform 214 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 2, data storage devices 216, 218, and 220 are decoupled from the computing resources associated with execution platform 212. This architecture supports dynamic changes to data processing platform 200 based on the changing data storage/retrieval needs as well as the changing needs of the users and systems accessing data processing platform 200. The support of dynamic changes allows data processing platform 200 to scale quickly in response to changing demands on the systems and components within data processing platform 200. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 202, metadata 210, execution platform 212, and storage platform 214 are shown in FIG. 2 as individual components. However, each of resource manager 202, metadata 210, execution platform 212, and storage platform 214 may be implemented as a distributed system (e.g., distributed across multiple systems/platforms at multiple geographic locations). Additionally, each of resource manager 202, metadata 210, execution platform 212, and storage platform 214 can be scaled up or down (independently of one another) depending on changes to the requests received from users 204-208 and the changing needs of data processing platform 200. Thus, in the described embodiments, data processing platform 200 is dynamic and supports regular changes to meet the current data processing needs.

Figure 3:
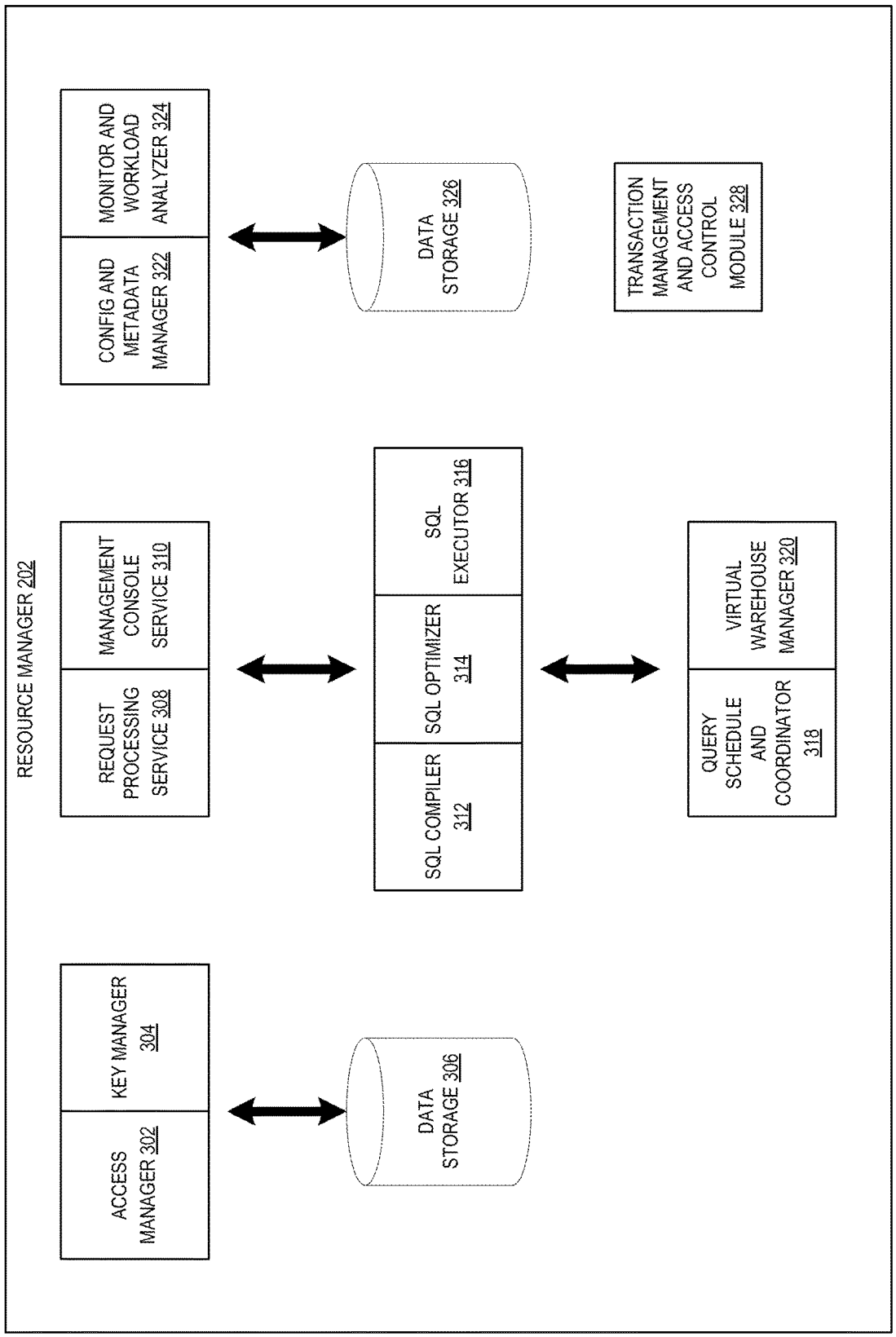
FIG. 3 illustrates a block diagram depicting an embodiment of a resource manager, in accordance with one or more embodiments of the present disclosure.

FIG. 3 illustrates a block diagram depicting an embodiment of a resource manager 202, in accordance with one or more embodiments of the present disclosure. As shown in FIG. 3, resource manager 202 includes an access manager 302 and a key manager 304 coupled to a data storage device 306. Access manager 302 handles authentication and authorization tasks for the systems described herein. Key manager 304 manages storage and authentication of keys used during authentication and authorization tasks. A request processing service 308 manages received data storage requests and data retrieval requests. A management console service 310 supports access to various systems and processes by administrators and other system managers.

Resource manager 202 also includes an SQL compiler 312, an SQL optimizer 314 and an SQL executor 316. SQL compiler 312 parses SQL queries and generates the execution code for the queries. SQL optimizer 314 determines the best method to execute queries based on the data that needs to be processed. SQL executor 316 executes the query code for queries received by resource manager 202. A query scheduler and coordinator 318 sends received queries to the appropriate services or systems for compilation, optimization, and dispatch to execution platform 212. A virtual warehouse manager 320 manages the operation of multiple virtual warehouses implemented in execution platform 212.

Additionally, resource manager 202 includes a configuration and metadata manager 322, which manages the information related to the data stored in the remote data storage devices and in the local caches. A monitor and workload analyzer 324 oversees the processes performed by resource manager 202 and manages the distribution of tasks (e.g., workload) across the virtual warehouses and execution nodes in execution platform 212. Configuration and metadata manager 322 and monitor and workload analyzer 324 are coupled to a data storage device 326.

Resource manager 202 also includes a transaction management and access control module 328, which manages the various tasks and other activities associated with the processing of data storage requests and data access requests. For example, transaction management and access control module 328 provides consistent and synchronized access to data by multiple users or systems. Since multiple users/systems may access the same data simultaneously, changes to the data must be synchronized to ensure that each user/system is working with the current version of the data. Transaction management and access control module 328 provides control of various data processing activities at a single, centralized location in resource manager 202.

In one embodiment, the SQL executor 316 may determine that an available amount of space in a first memory (e.g., amount of free or unused space) is insufficient for a query that is being executed by data processing platform 200. For example, the SQL executor 316 may determine that the amount of available space in a cache, buffer, or first set of memory devices used by a set of relational queries (e.g., one or more relational queries), is insufficient for a first relational join query. As discussed above, the first relational join query may be a join operation, such as a hash join.

In one embodiment, the SQL executor 316 may determine a set of build memory sizes and a set of probe memory sizes for a set of partitions that are used by the set of relational queries. A partition may be a portion, block, section, etc., of the first memory that is allocated to or associated with a particular relational query. Each relational query may use one or more partitions to store information/data that is used to execute the relational query. For example, each relational query may use a partition to store rows (of database tables), hashes, and/or other data used during the execution of the relational query.

As discussed above, the relational queries may be join operations. For example, the relational queries may be hash joins. A hash join may build hash tables from the tuples of one or both of the joined relations, and subsequently probe those tables so that tuples with the same hash code are compared for equality. Each hash join may have a set of build operators (e.g., one or more build operators) and a set of probe operators (e.g., one or more probe operators) to execute the hash join. Each of the build operators may store information/data used by the build operator (e.g., hash tables, rows, etc.) in a partition associated with the hash join that corresponds to the build operator. The amount of space in a partition that is used by a build operator may be referred to as a build memory size. Each of the probe operators may store information/data used by the build operator (e.g., hash tables, rows, etc.) in a partition associated with the hash join that corresponds to the probe operator. The amount of space in a partition that is used by a probe operator may be referred to as a probe memory size.

In one embodiment, the SQL executor 316 may determine a set of build memory sizes (of build operators of the set of relational queries). For example, the SQL executor 316 may analyze each partition and may determine how much of the partition is used to store data/information used by the build operators.

In one embodiment, the SQL executor 316 may also determine a set of probe memory sizes (of probe operators of the set of relational queries). For example, the SQL executor 316 may determine the set of probe memory sizes by estimating the probe memory size for each partition. Because the results of probe operator are streamed to the corresponding build operator as the build operator uses the results, the SQL executor 316 may estimate the probe memory size. The SQL executor may determine an estimate (e.g., a probe memory size) for each probe operated based on a number of rows that may be processed by the probe operator and an average size of the rows (e.g., may multiple the number of rows by the average size of a row).

In one embodiment, the SQL executor 316 may identify (e.g., determine, select, etc.) a first partition (of the set of partitions) based on the set of probe memory sizes and the set of build memory sizes. For example, the SQL executor 316 may analyze the set of build memory sizes and/or the set of probe memory sizes based on various factors, conditions, criteria, thresholds, etc., as discussed in more detail below. The first partition may be associated with or used by one of the hash joins that is executing on the data processing platform 200.

In one embodiment, the SQL executor 316 may identify the first partition by identifying a subset of the set of partitions (e.g., a subset of partitions) based on the set of build memory sizes (for the set of partitions) and a threshold memory size. For example, the SQL executor 316 may determine (e.g., calculate) a build memory size for each partition in the set of partitions (e.g., determine the amount of space in the first memory and/or partition used by a build operator). The SQL executor 316 may compare the build memory size for each partition with the threshold memory size (e.g., a threshold size) to determine the partition should be included in the subset of partitions.

In one embodiment, the threshold memory size may be a percentage, portion, ratio, etc., of the maximum or largest build memory size. For example, if the largest build memory size is 100 megabytes (MB), the threshold memory size may be a percentage (e.g., 70%, 85%, or some other appropriate percentage) of 100 MB. In other embodiments, the threshold memory size may be determined, selected, calculated, etc., in different ways. For example, the threshold memory size may be an average build memory size for the set of partitions.

In one embodiment, the SQL executor 316 may select, identify, etc., partitions that have a build memory size that is equal to or greater than the threshold memory size. For example, if the maximum build memory size is 100 MB, the threshold memory size may be 70 MB (e.g., 70% of the maximum build memory size). The SQL executor 316 may identify, select, etc., a subset of partitions that have a build memory size that is greater than or equal to 70 MB.

In one embodiment, the SQL executor 316 may identify the first partition by identifying the first partition from the subset of partitions based on the set of probe memory sizes.

For example, the SQL executor 316 may determine (e.g., calculate, estimated, etc.) a probe memory size for each of the partitions in the subset of partitions (e.g., determine the amount of space in the first memory and/or partition used by a probe operator). The SQL executor 316 may compare the probe memory sizes for each partition and identify the partition that has the minimum (e.g., smallest) probe memory size.

In one embodiment, the SQL executor 316 may copy the first partition (e.g., the partition identified based on the set of probe memory sizes and the set of build memory sizes) from the first memory to a second memory. For example, the SQL executor 316 may copy the first partition from a cache (e.g., a first memory, random access memory (RAM)) to a disk drive (e.g., a second memory, a hard disk drive, a flash disk, etc.). Copying the first partition from the first memory to the second memory may be referred to as spilling the first partition. As discussed above, the first partition may include a first portion (e.g., a build portion) that includes data/information used by a build operator and a second portion (e.g., a probe portion) that includes data/information used by a probe operator. In some embodiments, the second memory may be slower or have higher latency than the first memory. For example, accessing data (e.g., writing or reading data) from the first memory may be faster than accessing data from the second memory.

In one embodiment, the SQL executor 316 may allocate or reallocate the portion of the first memory (e.g., a cache, RAM, etc.) to another partition of the set of partitions. For example, the SQL executor 316 may copy another partition into the portion of the first memory that was previously used by the first partition (e.g., the partition that was spilled or copied to the second memory).

In one embodiment, copying the first partition from the first memory to the second memory reduces an amount of data traffic in the data processing platform 200. For example, copying the first partition from the first memory to the second memory may reduce the amount of data traffic in the data processing platform when compared to copying another partition (from the set of partitions) to the first memory, as discussed in more detail below.

Figure 4:
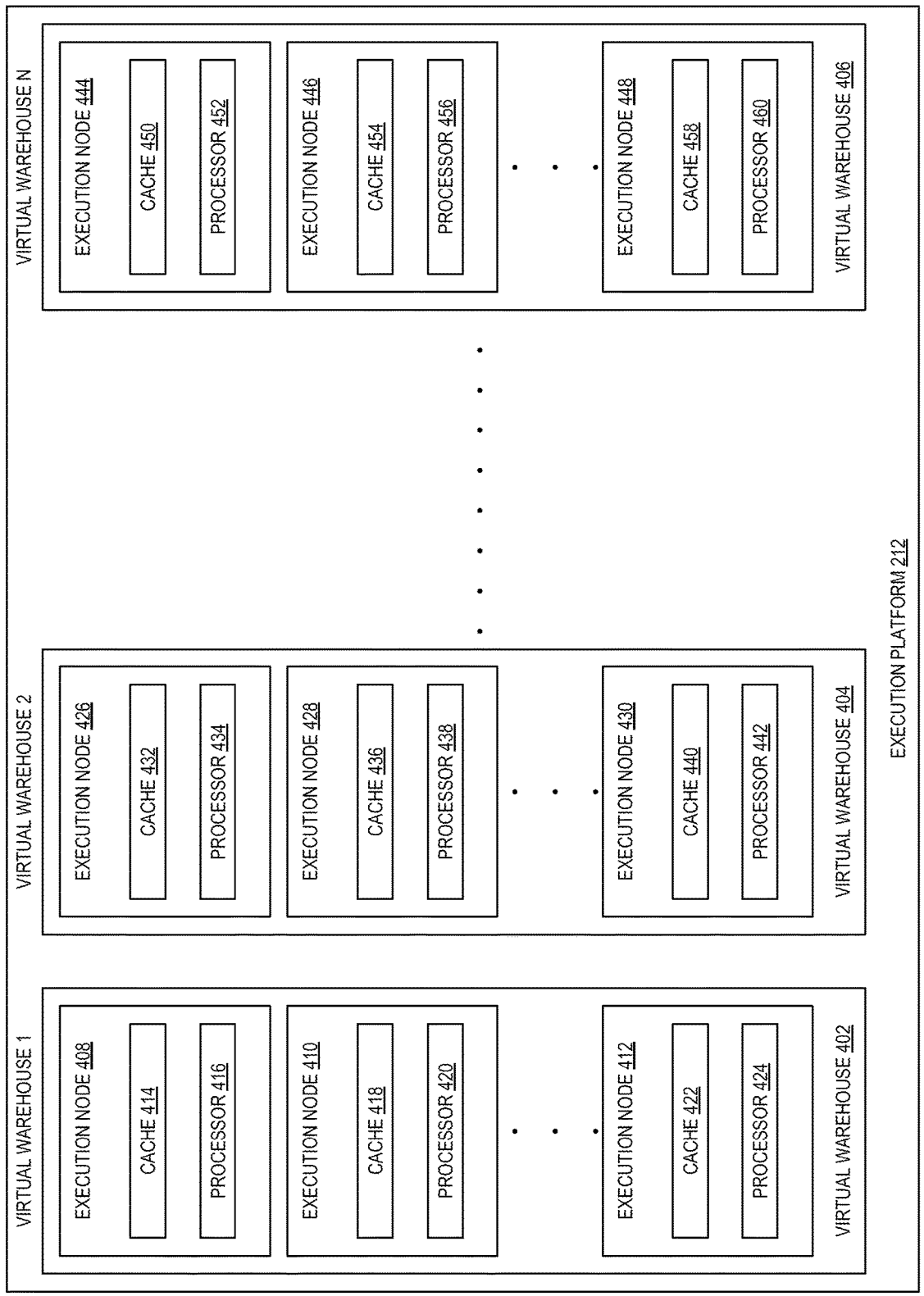
FIG. 4 illustrates a block diagram depicting an embodiment of an execution platform, in accordance with one or more embodiments of the present disclosure.

FIG. 4 illustrates a block diagram depicting an embodiment of an execution platform 212 of FIG. 2 that is an example of a distributed system, in accordance with one or more embodiments of the present disclosure. As shown in FIG. 4, execution platform 212 includes multiple virtual warehouses 402, 404, and 406. Each virtual warehouse includes multiple execution nodes that each include a cache and a processor. Although each virtual warehouse 402-406 shown in FIG. 4 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse 402-406 is capable of accessing any of the data storage devices 216-220 shown in FIG. 2. Thus, virtual warehouses 402-406 are not necessarily assigned to a specific data storage device 216-220 and, instead, can access data from any of the data storage devices 216-220. Similarly, each of the execution nodes shown in FIG. 4 can access data from any of the data storage devices 216-220. In some embodiments, a particular virtual warehouse or a particular execution node may be temporarily assigned to a specific data storage device, but the virtual warehouse or execution node may later access data from any other data storage device.

In the example of FIG. 4, virtual warehouse 402 includes three execution nodes 408, 410, and 412. Execution node 408 includes a cache 414 and a processor 416. Execution node 410 includes a cache 418 and a processor 420. Execution node 412 includes a cache 422 and a processor 424. Each execution node 408-412 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 402 discussed above, virtual warehouse 404 includes three execution nodes 426, 428, and 430. Execution node 426 includes a cache 432 and a processor 434. Execution node 428 includes a cache 436 and a processor 438. Execution node 430 includes a cache 440 and a processor 442. Additionally, virtual warehouse 406 includes three execution nodes 444, 446, and 448. Execution node 444 includes a cache 450 and a processor 452. Execution node 446 includes a cache 454 and a processor 456. Execution node 448 includes a cache 458 and a processor 460.

Although the execution nodes shown in FIG. 4 each include one cache and one processor, alternate embodiments may include execution nodes containing any number of processors and any number of caches. Additionally, the caches may vary in size among the different execution nodes. The caches shown in FIG. 4 store, in the local execution node, data that was retrieved from one or more data storage devices in storage platform 214 (FIG. 2). Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in storage platform 214.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 402-406 are associated with the same execution platform 212, the virtual warehouses may be implemented using multiple computing systems at multiple geographic locations. For example, virtual warehouse 402 can be implemented by a computing system at a first geographic location, while virtual warehouses 404 and 406 are implemented by another computing system at a second geographic location. In some embodiments, these different computing systems are cloud-based computing systems maintained by one or more different entities.

Additionally, each virtual warehouse is shown in FIG. 4 as having multiple execution nodes. The multiple execution nodes associated with each virtual warehouse may be implemented using multiple computing systems at multiple geographic locations. For example, a particular instance of virtual warehouse 402 implements execution nodes 408 and 410 on one computing platform at a particular geographic location, and implements execution node 412 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. Execution platform 212 is also fault tolerant. For example, if one virtual warehouse fails, that virtual warehouse is quickly replaced with a different virtual warehouse at a different geographic location.

A particular execution platform 212 may include any number of virtual warehouses 402-406. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

FIG. 5 is an example table 500 illustrating build memory sizes and probe memory sizes for different partitions, in accordance with one or more embodiments of the present disclosure. The table 500 includes two rows (e.g., Build Memory Size and Probe Memory Size) and four columns (e.g., Partition A, Partition B, Partition C, and Partition D).

Each column represents a partition of a data processing platform (e.g., of data processing platform 200 illustrated in FIG. 2). A single relational query uses multiple partitions. In this example, columns Partition A, Partition B, Partition C and Partition D represent four partitions used by a single relational query (e.g., a single hash join).

Each row indicates an amount of memory used by a partition. For example, the first row (e.g., Build Memory Size) indicates the amount of memory used by build operators for Partition A, Partition B, and Partition C. In another example, the second row (e.g., Probe Memory Size) indicates the amount of memory used by probe operators for Partition A, Partition B, and Partition C.

As discussed above, the data processing platform (e.g., an SQL executor of the data processing platform) may identify a partition (from a set or group of partitions) to copy from a first memory (e.g., RAM) to a second memory (e.g., a hard disk) based on the build memory sizes and the probe memory sizes of the partitions. The data processing platform may analyze the build memory sizes of the Partitions A through D to identify the partition with the largest build memory size. As illustrated in table 500, Partition A has the largest build memory size at 100 MB. The data processing platform may determine a threshold memory size based on the largest build memory size (e.g., 100 MB). For example, the data processing platform may determine that the threshold memory size should be 80% of the maximum memory (e.g., threshold memory size=80% of 100 MB=80 MB).

The data processing platform may also identify a subset of the partitions A through D where each partition in the subset of partitions has a build memory size that is greater than or equal to the threshold memory size (e.g., greater than or equal to 80 MB). The data processing platform may select Partition A, Partition B, and Partition for the subset of the partitions.

The data processing platform may further identify the partition (to copy from a first memory) based on the subset of the partitions A through D (e.g., based on partitions A through C). As discussed above, the data processing platform may determine the probe memory sizes of partitions A through C. The data processing platform may select the partition that has the lowest probe memory size (and also has a build memory size that is greater than or equal to the threshold memory size). Thus, the data processing platform may select/identify Partition B because Partition B has the smallest probe memory size and also have a build memory size that is greater than or equal to the threshold memory size (e.g., 80 MB). The data processing system may then copy Partition B (e.g., hashes, rows, or other data) from the first memory to the second memory.

In one embodiment, copying the Partition B from the first memory to the second memory reduces an amount of data traffic in the data processing platform 200. For example, copying the Partition B from the first memory to the second memory may reduce the amount of data traffic in the data processing platform when compared to copying Partition C or Partition A. When a partition is copied from the first memory to the second memory, both the build portion and the probe portion of the partition will be copied to the second memory. Thus, the data processing platform will read the build and probe portions from the first memory and write the build and probe portions to the second memory. This may result in data traffic in the data processing platform. For example, copying the data to the second memory may result in input/output (I/O) operations (e.g., read/write operations) which may use resources of the data processing platform. In another example, the second memory may be located at a location separate from the first memory and the data may be transferred to the second memory via a network which may use network traffic/resources of the data processing platform.

Thus, when copying data (e.g., spilling data), it may be useful to consider the amount of memory that is being freed (when a partition is copied to the second memory) and the amount of data traffic (e.g., amount of I/O operations or network traffic) that will result when the data used by the probe operator is copied or spilled as well. The embodiments, implementations, and/or examples, described herein allow the data processing platform to use the build memory sizes and probe memory sizes to identify a partition that will free up enough space in the first memory, while reducing the amount of data traffic that results from copying the partition from the first memory to the second memory.

Figure 6:
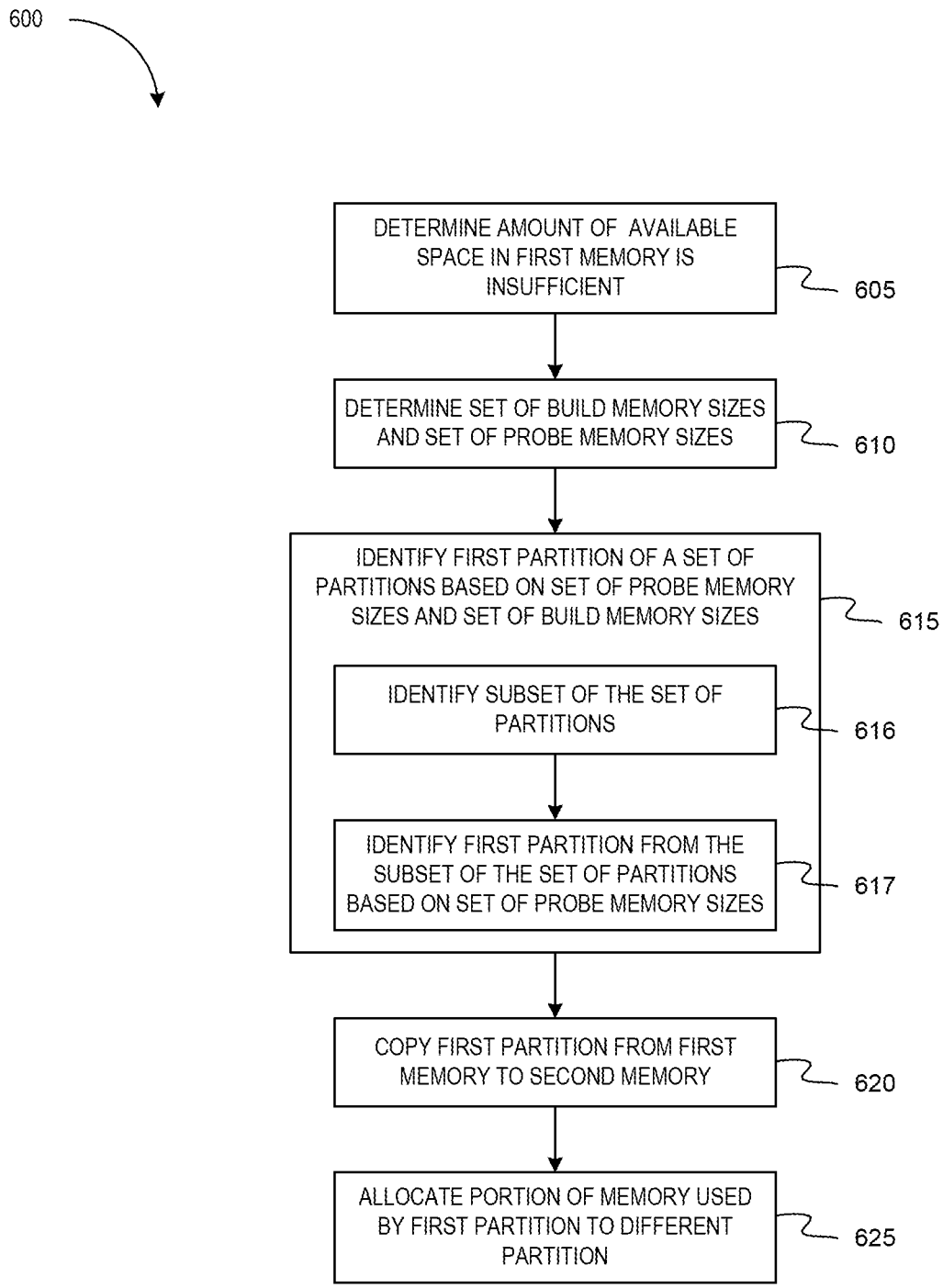
FIG. 6 is a flow diagram of an example method to copy data used by a relational query, in accordance with one or more embodiments of the present disclosure.

FIG. 6 is a flow diagram of an example method 600 to copy data used by a relational query, in accordance with one or more embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by one or more of a computing device, a data processing platform (e.g., data processing platform 200 illustrated in FIG. 2), and/or a SQL executor (e.g., a SQL executor 316 illustrated in FIG. 3).

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed. In addition, additional other blocks (not illustrated in FIG. 6) may be inserted between the blocks illustrated in FIG. 6.

The method 600 begins at block 605 where the method 600 may determine that the amount of available space in a first memory is insufficient for one or more relational queries that are executing in the data processing system (e.g., one or more hash joins). At block 610, the method 600 may determine a set of build memory sizes and a set of probe memory sizes for a set of partitions (of the set of relational queries) that are in the first memory.

At block 615, the method 600 may identify a first portion of the set of partitions based on the set of memory probe sizes and the set of build memory sizes. In particular, the method 600 may identify a subset of set of partitions based on the build memory sizes at block 616. The method 600 may further identify the first partition from the subset of the set of partitions based on the set of probe memory sizes at block 617. The method 600 may optionally determine the set of probe memory sizes at block 617 (e.g., may generate, determine, calculate, etc., estimates of the probe memory sizes for the partitions).

At block 620, the method 600 may copy the first partition from the first memory (e.g., a cache, RAM, etc.) to the second memory (e.g., a disk drive, a hard disk drive, etc.). For example, the method 600 may copy the hash tables, rows, and/or other data used by a corresponding relational query (e.g., a hash join) from the first memory to the second memory. At block 625, the method 600 may allocate or reallocate the portion of the first memory used by the first partition to a different partition. For example, the method 600 may copy the hash tables, rows, and/or other data used by another relational query (e.g., another hash join) into the portion of the first memory used by the first partition.

Figure 7:
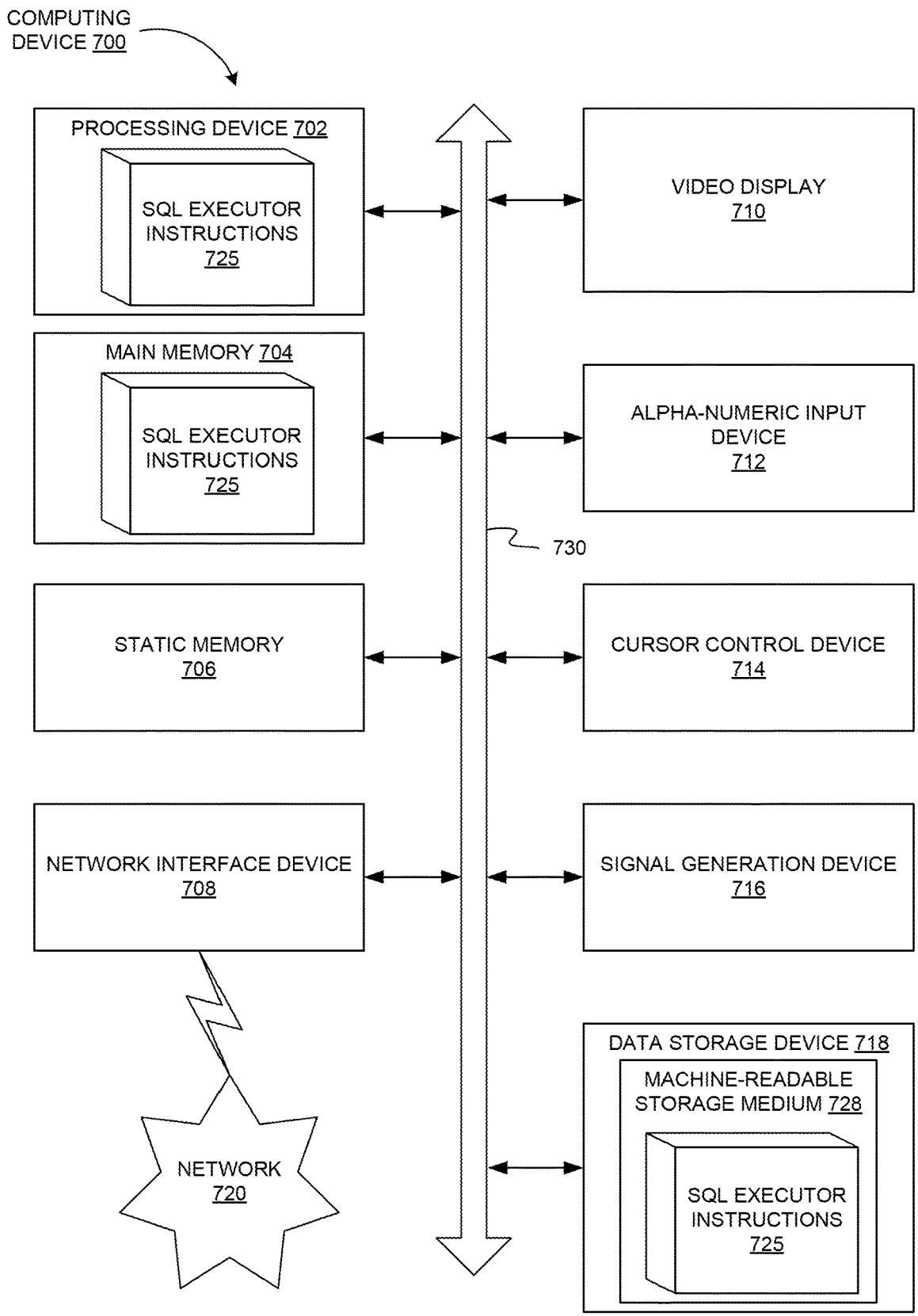
FIG. 7 is a block diagram of an example computing device that may perform one or more of the operations described herein, in accordance with one or more embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein. In one embodiment, processing device 702 represents resource manager 202 and/or SQL executor 316 of FIG. 3.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions for carrying out the operations described herein, in accordance with one or more aspects of the present disclosure. SQL executor instructions 725 may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 8:
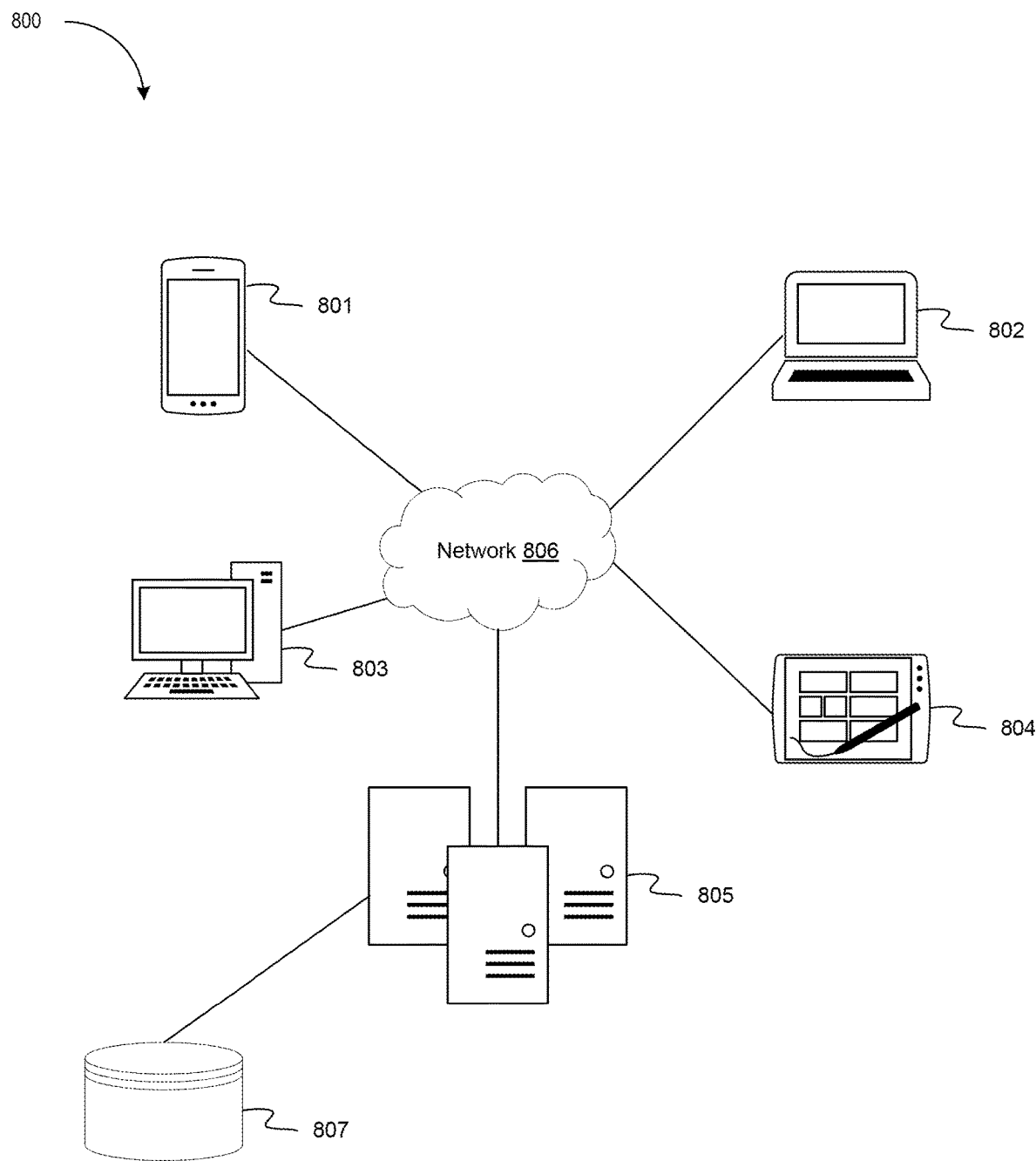
FIG. 8 is a block diagram of an example network that may perform one or more of the operations described herein, in accordance with one or more embodiments of the present disclosure.

As illustrated in FIG. 8, the system 800 includes computing devices 801, 802, 803, 804, and 805. In one embodiment, the computing devices 801-805 can be a smartphone or tablet, laptop, personal computer, server, or cluster. The computing devices 801, 802, 803, 804, and 805 may be coupled to each other (e.g., may be operatively coupled, communicatively coupled, may communicate data/messages with each other) via network 806. Network 806 may be a public network (e.g., the internet), a private network (e.g., a local area network (LAN) or wide area network (WAN)), or a combination thereof. In one embodiment, network 806 may include a wired or a wireless infrastructure, which may be provided by one or more wireless communications systems, such as a WiFi™ hotspot connected with the network 806 and/or a wireless carrier system that can be implemented using various data processing equipment, communication towers (e.g. cell towers), etc. In some embodiments, the network 806 may be an L2 or an L3 network. The network 806 may carry communications (e.g., data, message, packets, frames, etc.) between any one of the computing devices 801, 802, 803, 804, and/or 805. Each of 801, 802, 803, 804, and/or 805 may include hardware components (e.g. processing device such as processors, central processing units (CPUs), memory (e.g., random access memory (e.g., RAM), storage devices (e.g., hard-disk drive (HDD), solid-state drive (SSD), etc.), data storage device, and other hardware devices (e.g., sound card, video card, etc.). Each of 801, 802, 803, 804, and/or 805 may include a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Data storage device 807 may be configured for long-term storage of data and may retain data between power on/off cycles of the computing device 805.

Each computing device may comprise any suitable type of computing device or machine that has a programmable processor including, for example, server computers, desktop computers, laptop computers, tablet computers, smartphones, set-top boxes, etc. In some examples, each of the computing devices 801, 802, 803, 804, and/or 805 may comprise a single machine or may include multiple interconnected machines (e.g., multiple servers configured in a cluster). The computing devices 801, 802, 803, 804, and/or 805 may be implemented by a common entity/organization or may be implemented by different entities/organizations. For example, computing device 802 may be operated by a first company/corporation and computing device 803 may be operated by a second company/corporation. Each of computing devices 802, 803, and/or 804 may execute or include an operating system (OS) such as host OS. The host OS of a computing device 801, 802, 803, 804, and/or 805 may manage the execution of other components (e.g., software, applications, etc.) and/or may manage access to the hardware (e.g., processors, memory, storage devices etc.) of that computing device.

Unless specifically stated otherwise, terms such as "determining," "identifying," "copying," "allocating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   determining an amount of available space in a first memory used by a set of relational queries is insufficient for a query, wherein the query comprises a join operation;
   identifying a first partition of a set of partitions based on a set of probe memory sizes and a set of build memory sizes, wherein identifying the first partition comprises identifying a subset of the set of partitions based on the set of build memory sizes and a threshold memory size, wherein the first partition possesses:
   a smallest available probe memory size of the set of partitions; and
   a build memory size greater than or equal to the threshold memory size, wherein the threshold memory size is a percentage of a maximum build memory size and an average of the build memory sizes of the set of partitions, wherein the largest partition of the set of partitions has the maximum build memory size; and
   copying the first partition from the first memory to a second memory.

2. The method of claim 1, wherein each partition in the set of partitions has a build memory size that is equal to or greater than the threshold memory size.

3. The method of claim 1, wherein:
   a set of probe memory sizes for the set of partitions comprises a set of estimates for probe portions of the set of partitions; and
   each estimate of the set of estimates is determined based on a number of rows and an average size of the rows within a corresponding probe operation.

4. The method of claim 1, wherein copying the first partition from the first memory to the second memory reduces an amount of data traffic compared to copying one or more other partitions of the set of partitions to the first memory.

5. The method of claim 1, further comprising allocating a portion of memory used by the first partition to another partition.

6. The method of claim 1, wherein the join operation comprises a hash join operation.

7. A system comprising:
   a memory; and
   a processing device operatively connected to the memory, the processing device to:

determine an amount of available space in a first memory used by a set of relational queries is insufficient for a query, wherein the query comprises a join operation;

identify a first partition of a set of partitions based on a set of probe memory sizes and a set of build memory sizes, wherein to identify the first partition is further to identify a subset of the set of partitions based on the set of build memory sizes and a threshold memory size, wherein the first partition possesses:

a smallest available probe memory size of the set of partitions; and a build memory size greater than or equal to the threshold memory size, wherein the threshold memory size is a percentage of a maximum build memory size and an average of the build memory sizes of the set of partitions, wherein the largest partition of the set of partitions has the maximum build memory size; and copy the first partition from the first memory to a second memory.

8. The system of claim 7, wherein each partition in the set of partitions has a build memory size that is equal to or greater than the threshold memory size.

9. The system of claim 7, wherein:

a set of probe memory sizes for the set of partitions comprises a set of estimates for probe portions of the set of partitions; and each estimate of the set of estimates is determined based on a number of rows and an average size of the rows within a corresponding probe operation.

10. The system of claim 7, wherein to copy the first partition from the first memory to the second memory is to reduce an amount of data traffic compared to copying one or more other partitions of the set of partitions to the first memory.

11. The system of claim 7, further comprising allocate a portion of memory used by the first partition to another partition.

12. The system of claim 7, wherein the join operation comprises a hash join operation.

13. A non-transitory machine-readable medium storing instructions which, when executed by one or more processors of a processing device, cause the one or more processors to:

determine an amount of available space in a first memory used by a set of relational queries is insufficient for a query, wherein the query comprises a join operation;

identify a first partition of a set of partitions based on a set of probe memory sizes and a set of build memory sizes, wherein to identify the first partition is further to identify a subset of the set of partitions based on the set of build memory sizes and a threshold memory size, wherein the first partition possesses:

a smallest available probe memory size of the set of partitions; and a build memory size greater than or equal to the threshold memory size, wherein the threshold memory size is a percentage of a maximum build memory size and an average of the build memory sizes of the set of partitions, wherein the largest partition of the set of partitions has the maximum build memory size; and copy the first partition from the first memory to a second memory.

14. The non-transitory machine-readable medium of claim 13, wherein each partition in the set of partitions has a build memory size that is equal to or greater than the threshold memory size.

15. The non-transitory machine-readable medium of claim 13, wherein:

a set of probe memory sizes for the set of partitions comprises a set of estimates for probe portions of the set of partitions; and each estimate of the set of estimates is determined based on a number of rows and an average size of the rows within a corresponding probe operation.

16. The non-transitory machine-readable medium of claim 13, wherein to copy the first partition from the first memory to the second memory is to reduce an amount of data traffic compared to copying one or more other partitions of the set of partitions to the first memory.

17. The non-transitory machine-readable medium of claim 13, further comprising allocate a portion of memory used by the first partition to another partition.

\* \* \* \* \*